(12) United States Patent
Kozak

(10) Patent No.: US 7,334,970 B2
(45) Date of Patent: Feb. 26, 2008

(54) FAST CHANGE BIT HOLDER DEVICE

(75) Inventor: Ira M. Kozak, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 116 days.

(21) Appl. No.: 11/397,342

(22) Filed: Apr. 4, 2006

(65) Prior Publication Data

US 2006/0228181 A1  Oct. 12, 2006

Related U.S. Application Data

(60) Provisional application No. 60/669,443, filed on Apr. 8, 2005.

(51) Int. Cl.
*B23B 51/08* (2006.01)

(52) U.S. Cl. .............. 408/240; 7/158; 7/165; 279/14; 279/137

(58) Field of Classification Search ........... 408/238, 408/239 R, 239 A, 240; 7/158, 165; 279/14, 279/137, 42, 48, 52; B23B 51/08
See application file for complete search history.

(56) References Cited

U.S. PATENT DOCUMENTS

| | | | | |
|---|---|---|---|---|
| 1,306,354 A | * | 6/1919 | Robbins | 279/48 |
| 1,711,863 A | * | 5/1929 | Wendt | 433/133 |
| 2,176,071 A | * | 10/1939 | Hall | 279/54 |
| 2,370,487 A | * | 2/1945 | Poutie | 279/42 |
| 3,023,015 A | * | 2/1962 | Pankow | 279/14 |
| 3,973,784 A | * | 8/1976 | Smith | 279/144 |
| 4,573,839 A | * | 3/1986 | Finnegan | 408/239 R |
| 4,736,658 A | | 4/1988 | Jore | 81/451 |
| 5,470,180 A | | 11/1995 | Jore | 408/239 R |
| 5,651,647 A | * | 7/1997 | Ray | 408/239 R |
| 5,954,463 A | * | 9/1999 | Jore | 408/239 R |
| 6,488,452 B1 | * | 12/2002 | Hoskins et al. | 408/239 R |
| 6,511,268 B1 | * | 1/2003 | Vasudeva et al. | 408/239 R |
| 6,543,959 B1 | | 4/2003 | Jore | 403/322.2 |
| 6,722,667 B2 | | 4/2004 | Cantlon | 279/22 |
| 6,761,361 B2 | * | 7/2004 | Taylor et al. | 279/75 |
| 6,935,637 B2 | | 8/2005 | Cantlon | 279/75 |
| 7,237,987 B2 | * | 7/2007 | Hernandez et al. | 408/239 R |
| 2004/0262856 A1 | | 12/2004 | Cantlon | 279/22 |

* cited by examiner

*Primary Examiner*—Daniel W. Howell
(74) *Attorney, Agent, or Firm*—Cherskov & Flaynik

(57) ABSTRACT

A method and apparatus for forming apertures and inserting fasteners in a workpiece is disclosed. One embodiment relates generally to a bit holder device for forming apertures and inserting fasteners into a workpiece. This embodiment comprises a tool bit, a hex holder member, an adapter hex member, a double collet member, a collet retention cap and a drill bit. The drill bit is capable of drilling an aperture into a workpiece whereupon the drill bit, the collet retention cap, the double collet member and the adapter hex member are removed from the hex holder member thereby, allowing the tool bit to forcibly insert a fastener into the workpiece.

27 Claims, 13 Drawing Sheets

FAST CHANGE BIT HOLDER DEVICE

CROSS REFERENCE TO RELATED APPLICATIONS

This application is related to, claims the benefit of and priority from, U.S. Provisional Application Ser. No.: 60/669,443 filed Apr. 8, 2005, the complete subject matter of which is incorporated herein by reference in its entirety.

CONTRACTUAL ORIGIN OF THE INVENTION

Not Applicable.

BACKGROUND OF THE INVENTION

1. Field of the Invention

Embodiments relate generally to a method and apparatus for forming apertures and inserting fasteners into a workpiece, and more specifically to a bit holder device for forming apertures and inserting fasteners into a workpiece.

2. Background of the Invention

Drilling a hole or aperture in a workpiece is a well-known process in woodworking for example. Basically, a tool bit is inserted into a rotary drive tool (a drill or electric screwdriver for example). Upon application of rotary force, the drill bit drills an aperture in the workpiece. The drill bit is removed and a tool bit inserted in the rotary drive tool (i.e., the drill bit is "swapped out" for the tool bit). A fastener (a screw for example) is positioned in the aperture, and the tool bit is used to forcibly insert and secure the fastener in the workpiece. This step becomes slightly more time intensive if it is desired to countersink the fastener, so that the head or top of the fastener is substantially flush with the surface of the workpiece. In this operation, the drill bit is swapped out for a countersink tool. The countersink tool is used to enlarge at least a portion of the aperture. The countersink tool is than swapped out for the tool bit, which is used to forcibly insert and secure the fastener into the workpiece, such that the head of the fastener is substantially flush with the surface of the workpiece.

It should be appreciated that simply drilling an aperture and inserting a fastener using only one rotary drive tool can turn a simple task into a repetitive time intensive task. This is especially true for a large workpiece, requiring a large number of fasteners. One known solution is to use a combined drill bit and countersink. While this eliminates one step in the task, it does not otherwise affect the operation, as most of the time is spent drilling the aperture and inserting the fastener. Another solution is to use separate rotary tool devices for the drill bit, the countersink and the tool bit, each rotary tool device awaiting selection by operator. It is obvious that this can become both expensive (buying numerous tool devices) and burdensome (requiring charging or powering two or more separate rotary tool devices). Embodiments of the present invention are directed to overcoming the above-stated problems associated with

SUMMARY OF THE INVENTION

Embodiments relate generally to a method and apparatus for forming apertures and inserting fasteners into a workpiece. One embodiment relates to a fast change bit holder device comprising a tool bit, a hex holder member, an adapter hex member, a double collet member, a collet retention cap and a drill bit. The hex holder member has first and second ends and is configured to receive rotary force provided by a rotary drive tool. The hex holder member defines at least first and second inner recess portions for removably receiving first end and first mid-portions of the tool bit. The adapter hex member has first and second end portions and defines an inner recess portion for removably receiving a second end and second mid-portions of the tool bit. The first end portion of the adapter hex member has an outer wall configured for removable insertion into the second inner recess portion of the hex holder member, the second end portion of the adapter hex member has threads disposed upon an outer wall thereof.

This embodiment further comprises the double collet member having first and second end portions, the first end portion configured to detachably receive the second end and second mid-portions of the tool bit. The double collet member, the second end and second mid-portions of the tool bit, and the first end portion of the adapter hex member are cooperatively configured to transfer rotary motion from the tool bit to the double collet member when the first end portion of the double collet member is forcibly inserted into the second end of the adapter hex member, and the second end and the second mid-portions of the tool bit are forcibly inserted into the first end of the adapter hex member. The collet retention cap has a threaded inner wall that corresponds to the threaded outer wall of the second end portion of the adapter hex member such that the collet retention cap is rotationally joined to the second end portion of the adapter hex member.

The drill bit of this embodiment has a securing end that removably inserts into the second end portion of the double collet member. The securing end of the drill bit, the second end portion of the double collet member and an inner portion of the collet retention cap are cooperatively configured to transfer rotary motion from the double collet member to the drill bit when the securing end of the drill bit and the second end portion of the double collet member are forcibly inserted into the inner portion of the collet retention cap. The drill bit is capable of drilling an aperture into a workpiece whereupon the drill bit, the collet retention cap, the double collet member and the adapter hex member are removed from the hex holder member, thereby allowing the tool bit to forcibly insert a fastener into the workpiece via the aperture drilled into the workpiece by the drill bit.

Yet another embodiment relates to a fast change bit holder device comprising a shank, a tool bit, a hex holder member an adapter hex member, a double collet member, a collet retention cap, and a drill bit. The shank has first and second end portions, the first end portion configured for rotary insertion into a rotary drive tool. The hex holder member has first and second ends, the first end joined to the second end of the shank, where the hex holder member defines nested first, second and third inner recess portions.

This embodiment may include the adapter hex member having first and second end portions, with the first end portion defining an inner frusto-conically configured recess, and the second end portion including a hexagonally configured inner wall and a threaded outer wall. The double collet member has opposing first and second end portions with a plurality of gripping arms integrally joined to each of the end portions, where the double collet member defines a hexagonally configured mid-portion disposed between the opposing end portions. The collet retention cap has a cylindrically configured first inner recess with a threaded inner wall that corresponds to the threaded outer wall of the second end portion of the adapter hex member such that the collet retention cap is rotationally joined to the second end portion of the adapter hex member. The collet retention cap further defines a frusto-conically configured second inner recess disposed adjacent to the first inner recess thereby providing an aperture through the collet retention cap.

The drill bit of this embodiment has a securing end that removably inserts into a second end portion of the double collet member. The securing end of the drill bit, the second end portion of the double collet member and an inner portion of the collet retention cap being cooperatively configured to transfer rotary motion from the double collet member to the drill bit when the securing end of the drill bit and the second end portion of the double collet member are forcibly inserted into the inner portion of the collet retention cap. The drill bit is capable of drilling an aperture into a work piece, the first end portion of the double collet member forcibly grasping the tool bit upon the double collet member being forced into the adapter hex member thereby disposing the tool bit inside the third recess of the hex holder member. The tool bit and the drill bit are switchable, thereby allowing the tool bit to forcibly insert a fastener into the workpiece via the aperture drilled into the workpiece by the drill bit.

One or more embodiments comprise the first and second inner recesses of the hex holder member have a hexagonal configuration. The second inner recess of the hex holder member may include a configuration that cooperates with a first mid-portion of the tool bit such that rotary motion is transferred from the hex holder member to the tool bit.

At least one embodiment comprises the inner recess portion of the adapter hex member configured to cooperate with the second mid-portion of the tool bit such that rotary motion is transferred from the tool bit to the adapter hex member. The inner recess portion of the adapter hex member may have a hexagonal configuration for example.

Other embodiments comprise the first end portion of the double collet member having an inner recess and an outer periphery having a hexagonal configuration, where the inner recess and the outer periphery extending longitudinally to a mid-portion of the double collet member. The outer periphery of the first end portion of the double collet member may be configured for snug insertion into the inner recess portion of the adapter hex member such that the inner recess of the double collet member is configured to snugly receive the second end and the second mid-portions of the tool bit. Rotary motion is transferred from the tool bit to the first end portion of the double collet member. Further, in this embodiment, the inner wall of the double collet member may engage a tip portion of the tool bit, maintaining a position of the tool bit when the tool bit is forcibly disposed inside the inner recess of the double collet member, the inner wall being perpendicular to a longitudinal axis of the double collet member.

Still other embodiments comprise the second end portion of the double collet member including a plurality of gripping arms extending from a mid-portion of the double collet member. The gripping arms may include outer arcuate walls dimensioned to provide an outer cylindrical periphery configured to promote insertion into the collet retention cap, and inner arcuate walls that cooperate to grasp the drill bit such that rotary motion is transferred from the first end portion of the double collet member to the drill bit. The inner arcuate walls having a radial dimension substantially equal to the radial dimension of the drill bit. The gripping arms may extend parallel to a longitudinal axis of the double collet member. Further, the inner arcuate walls of the gripping arms may include an angled portion that forms an acute angle with the outer arcuate walls of the gripping arms, thereby promoting the insertion of the securing end of the drill bit into the second end portion of the double collet member; and a straight portion that extends parallel to the outer arcuate walls of the gripping arms thereby promoting grasping of the securing end of the drill bit to transfer rotary motion from the double collet member to the drill bit.

This embodiment may further include the inner portion of the collet retention cap defining a frusto-conically configured inner recess. The collet retention cap may include a cylindrically configured outer portion having a threaded cylindrical inner wall that promotes the rotational joining of the collet retention cap to the threaded outer wall of the second end of the adapter hex member.

In one or more embodiments, the rotational joining of the collet retention cap to the adapter hex member forcibly urges the inner arcuate walls of the gripping arms into congruent engagement with the securing end of the drill bit thereby promoting the transfer of rotary motion to the securing end of the drill bit. Such forcible urging of the inner arcuate walls of the gripping arms against the securing end of the drill bit occur after the second end portion of the double collet member is disposed inside the inner recess of the collet retention cap, and after the securing end of the drill bit is disposed inside the second end portion of the double collet member. The adapter hex member, double collet member, collet retention cap and drill bit are separable from the hex holder member and tool bit after drilling an aperture through a workpiece, thereby allowing the tool bit to forcibly insert a fastener through the aperture and into a structure supporting the workpiece.

Still other embodiments comprise a fast change bit holder device similar to those provided previously wherein at least a portion of the collet retention cap has a hexagonally configured outer wall configured to be removably snugly received in the first inner recess in the hex holder member. At least a portion of the collet retention cap may comprise a countersink device (comprising a frusto-conically configured portion for example) having at least one protrusion with opposing first and second ends, the first end coupled to the collet retention cap and the second end extending outwardly therefrom. Additionally, the countersink device may comprise at least one flute formed in an outer wall of the countersink device.

DESCRIPTION OF THE DRAWING

Embodiments together with the above and other objects and advantages may best be understood from the following detailed description of the embodiments illustrated in the drawings, wherein.

DETAILED DESCRIPTION OF THE INVENTION

Figure 1:
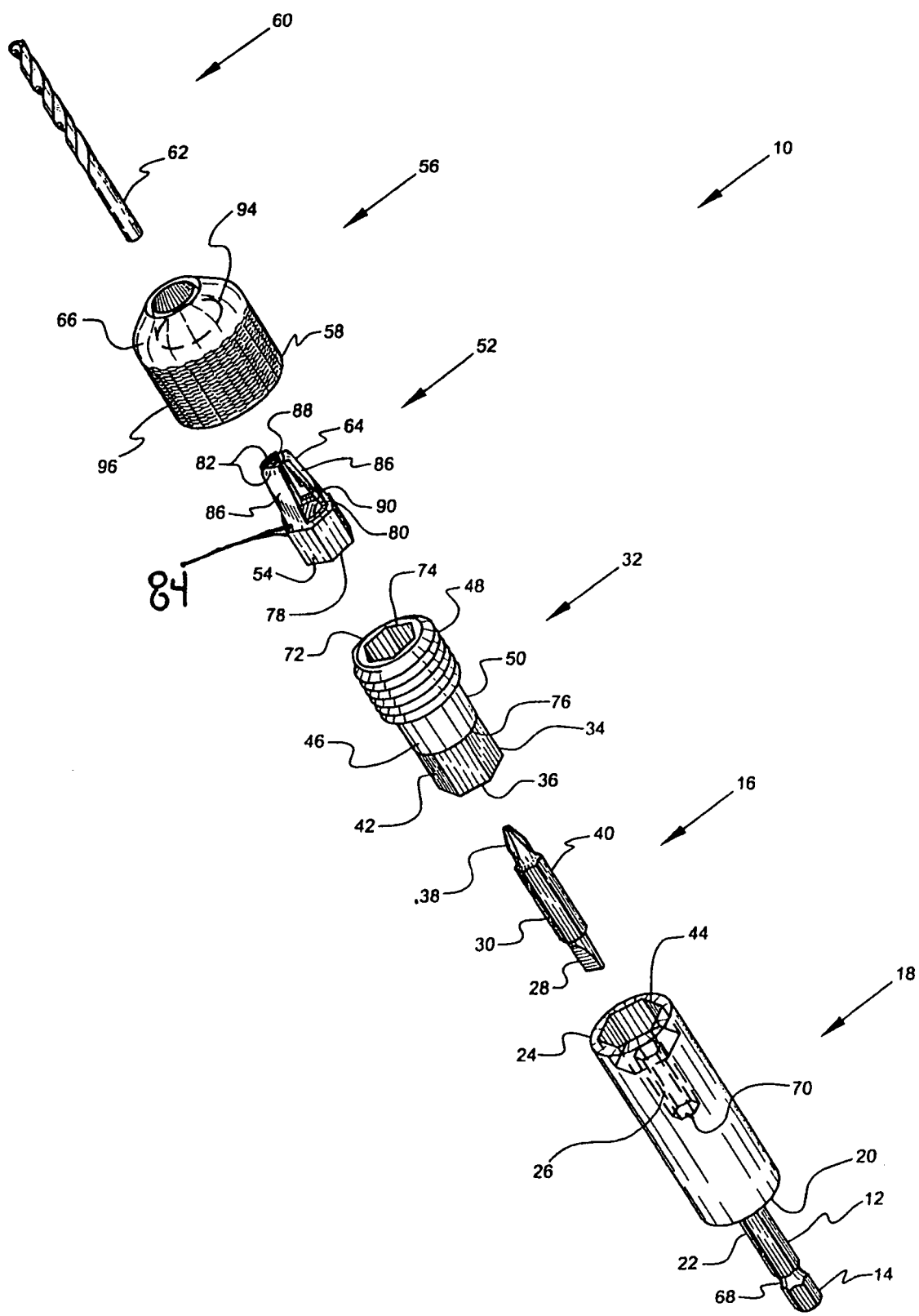
FIG. 1 depicts an exploded perspective view of a fast change bit holder device in accordance with one embodiment.

Embodiments relate generally to a method and apparatus for forming apertures and inserting fasteners into a workpiece, and more specifically to a bit holder device for forming apertures with a countersink and inserting fasteners into the workpiece.

Fast Change Bit Holder Detail

Referring now to FIGS. 1-5, a fast change bit holder device in accordance with one embodiment is depicted, generally designated numeral 10. The device 10 is fabricated from one or more materials of suitable hardness (steel for example) and, in at least one embodiment, comprises at least a shank 12, a tool bit 16, a hex holding member 18, an adapter hex member 32, a double collet member 52 and a collet retention cap 56.

Figure 2:
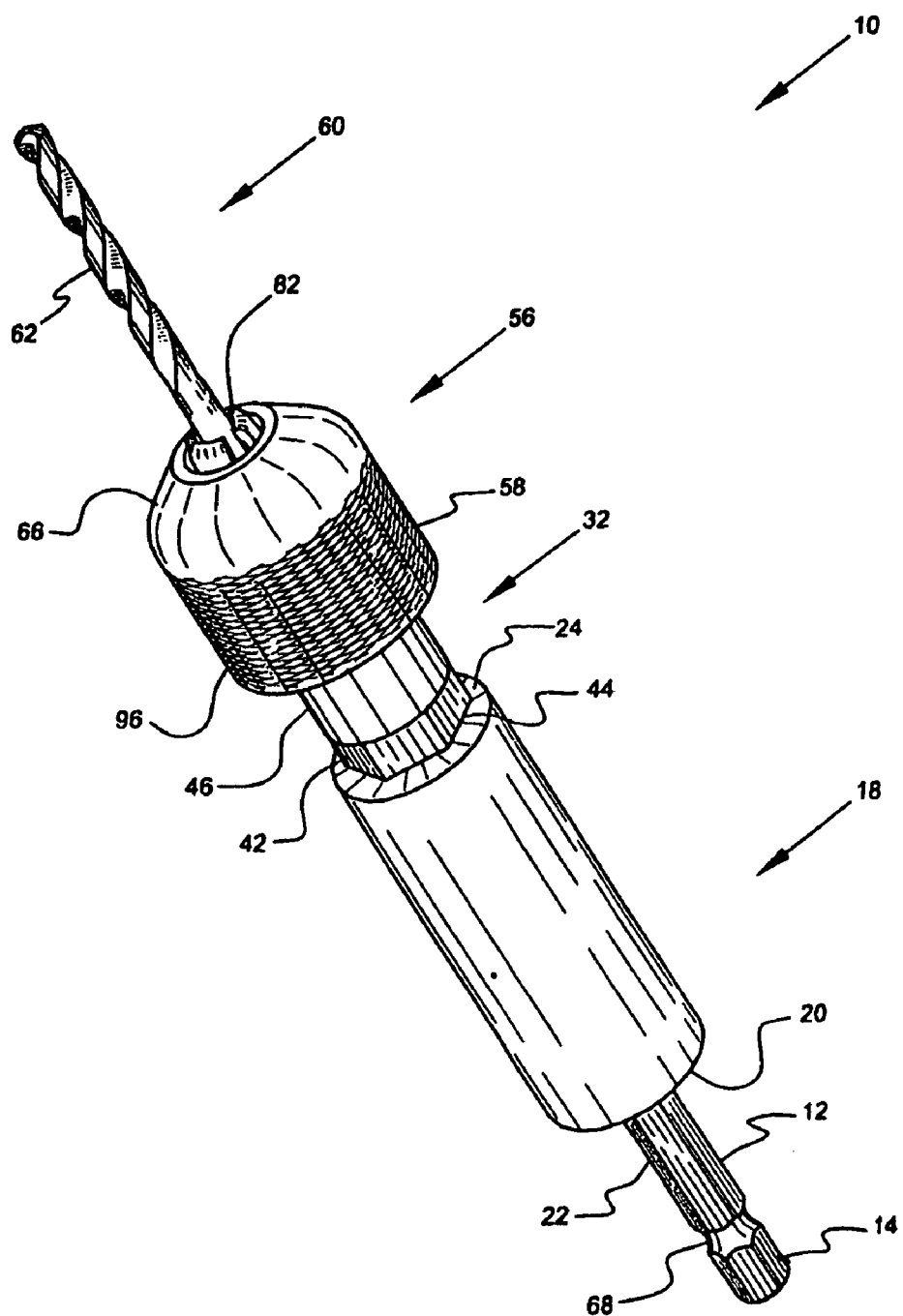
FIG. 2 depicts an assembled perspective view of the fast change bit holder device of FIG. 1 in accordance with one embodiment.
Figure 3:
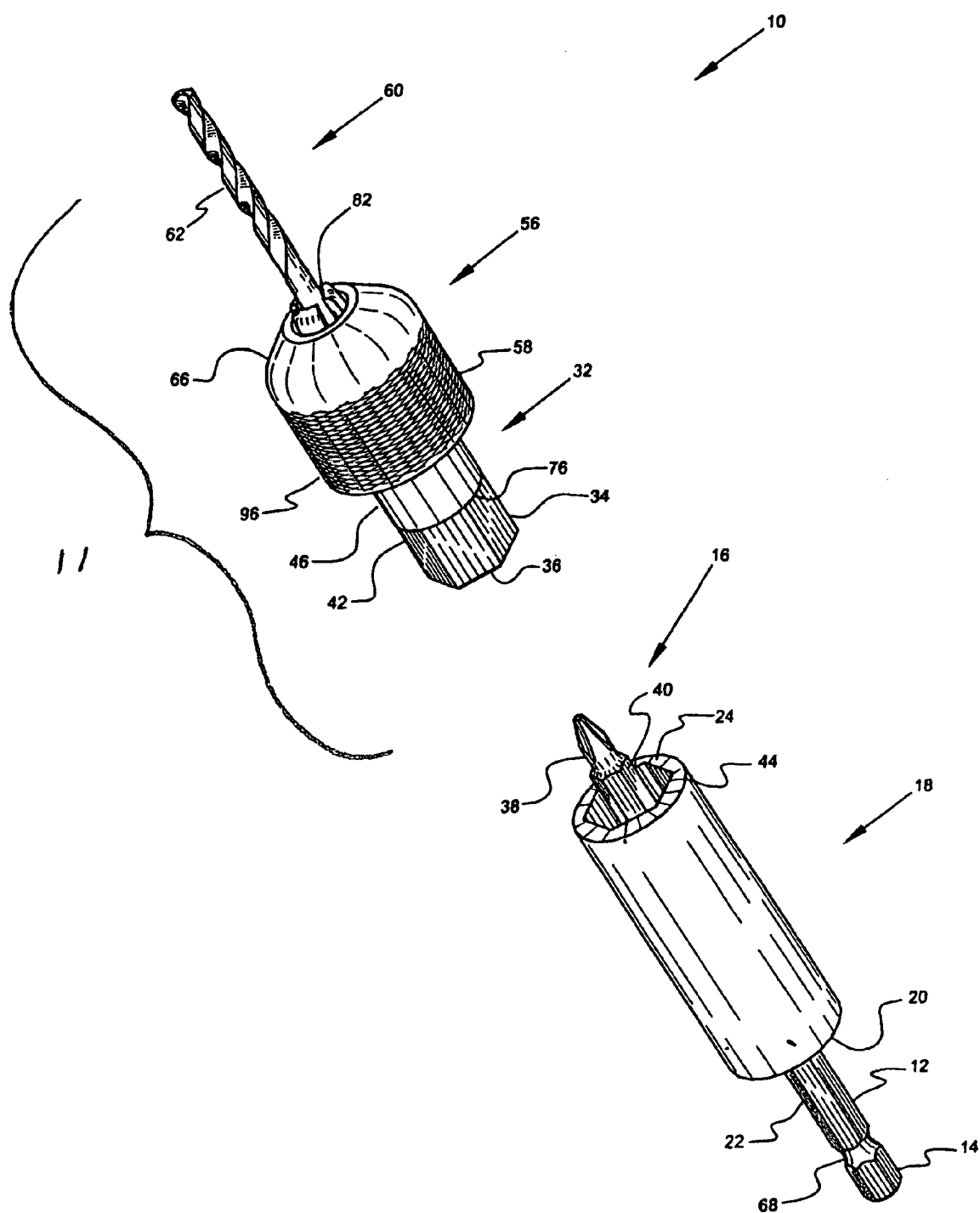
FIG. 3 depicts a partially exploded perspective view of the fast change bit holder device of FIG. 1 in accordance with one embodiment.
Figure 4:
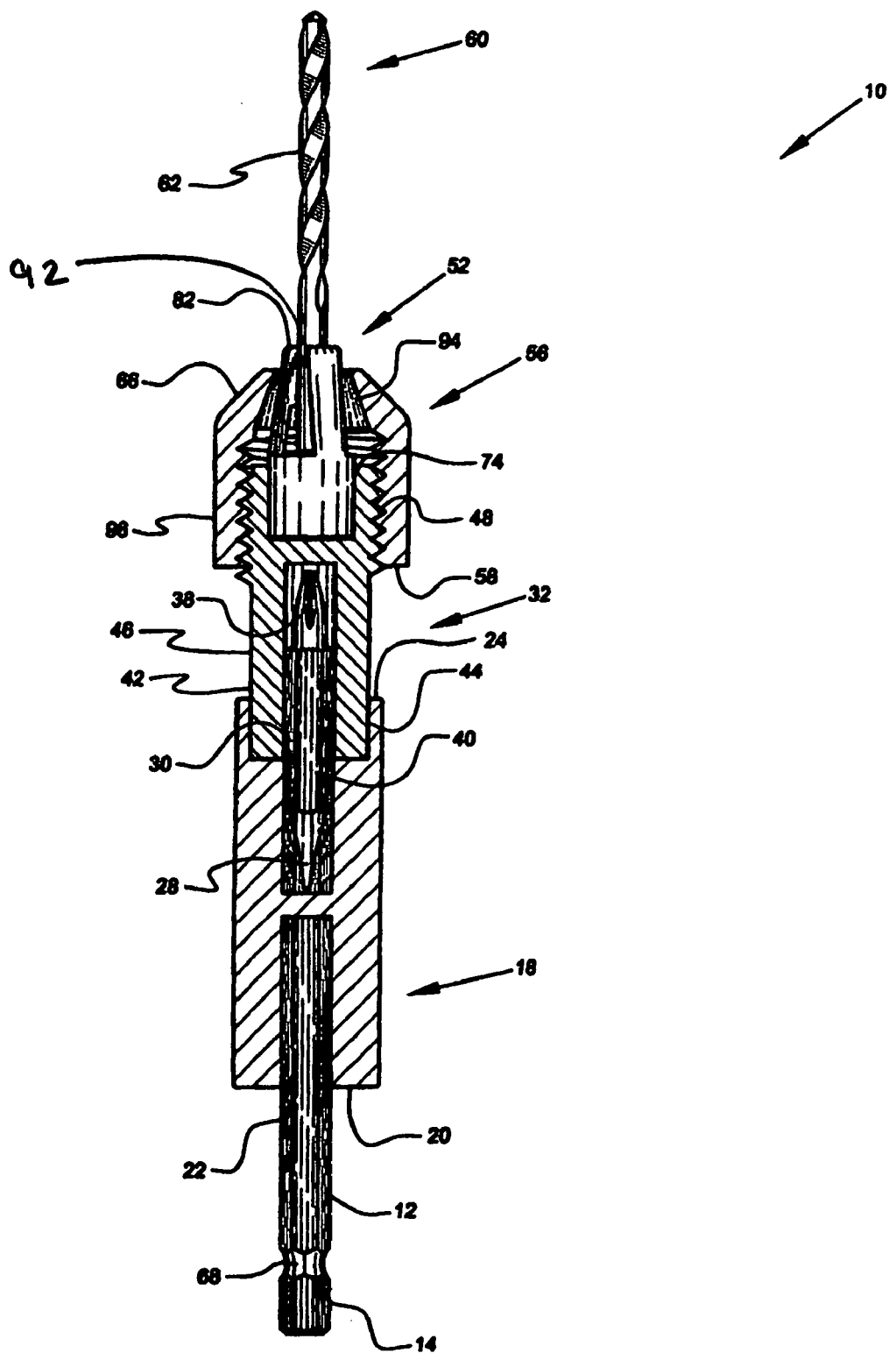
FIG. 4 depicts a sectional elevational view of the fast change bit holder device of FIG. 1 in accordance with another embodiment.

As illustrated in FIGS. 1-3, shank 12 includes first and second end portions 14 and 22, where first end 14 is configured for releasable insertion into a rotary drive tool (not pictured). The rotary drive tool (a drill or electric screwdriver for example) is in turn configured to provide rotary force to at least the shank 12.

The hex holder member 18 has first and second ends 20 and 24, where first end 20 matingly receives the second end 22 of the shank 12. The second end 24 of the hex holder member 18 includes and defines a nested first inner recess portion 26 for removably receiving tool bit 16.

In at least one embodiment, tool bit 16 comprises first end portion 28, first mid-portion 30, second mid-portion 40 and second end 38. Nested first inner recess portion 26 of hex holder member 18 is configured to removably receive at least first end portion 15 28 and first mid-portion 30 of the tool bit 16.

The adapter hex member 32 includes at least first and second end portions 34 and 46. The first end portion 34 includes and defines an inner recess portion 36 configured for removably receiving at least the second end portion 38 and second mid-portion 40 of the tool bit 16. The first end portion 34 of the adapter hex member 32 has an outer wall 42 configured for removable insertion into a second inner recess portion 44 defined in the hex holder member 18. The second end portion 46 of adapter hex member 32 includes threads 48 disposed upon an outer wall 50.

It should be noted that while the drawing depicts the hex holder member 18, the adapter hex member 32 and the collet retention cap 56, all having specific noncircular cross sectional geometries, the invention is not restricted to such geometries. Suitably noncircular geometries include polygons such as squares, hexagons, octagons, etc. and ellipsoid cross-sections that includes cross sections not having corners. Circular cross sections of the afore mentioned elements 18, 32, 56 are also suitable.

The device 10 further includes the double collet member 52 having first and second end portions 54 and 64. First end portion 54 is configured to detachably receive at least the second end portion 38 and the second mid-portion 40 of the tool bit 16. In at least one embodiment, the double collet member 52, second end portion 38, the second mid-portion 40, and the first end portion 34 of the adapter hex member 32 are cooperatively configured to transfer rotary motion from at least the tool bit 16 to the double collet 52 when the first end portion 54 of the double collet 52 is forcibly detachably inserted into the second end 24 of the adapter hex member 18, and the second end portion 38 15 and the second mid-portion 40 of the tool bit 16 are forcibly detachably inserted into the first end portion 34 of the adapter hex member 32. Further, the collet retention cap 56 has at least a threaded inner wall 58 that corresponds to the threads 48 of the adapter hex member 32 such that the collet retention cap 56 is rotationally detachably joined to the second end portion 46 of the adapter hex member 32. The outer surface 96 f the collet retention cap 56 is configured to enhance gripping by hand or wrench for example. In the first instance the surface 96 is knurled to provide friction enhancement. In the later instance, a polygonal cross section is provided.

While threaded inner wall 58 corresponding to threads 48 for rotationally detachably joining the collet retention cap 56 and the adapter hex member 32 are illustrated and discussed, other means for detachably joining the collet retention cap 56 and the adapter hex member 32 are contemplated. For example, such means could comprise lugs, detente securing means, set screws, etc.

In at least one embodiment, the device 10 is configured to use a drill bit, generally designated numeral 60. The drill bit 60 is depicted having a securing end 62 that removably inserts into the second end portion 64 of the double collet member 52. The securing end 62 of the drill bit 60, the second end portion 64 of the double collet member 52 and an inner portion 66 of the collet retention cap 56 are cooperatively configured to transfer rotary motion from at least the double collet member 52 to the drill bit 60 when the securing end 62 of the drill bit 60 and the second end portion 64 of the double collet member 52 are forcibly detachably inserted into the inner portion 66 of the collet retention cap 56. Upon application of rotary force, the drill bit 60 is capable of drilling an aperture into a workpiece, whereupon the drill bit 60, collet retention cap 56, double collet member 52 and the adapter hex member 32 are removed from the hex holder member 18. Tool bit 16 may then be used to forcibly insert a fastener into the workpiece via the aperture drilled by the drill bit 60.

In at least one embodiment, the shank 12 has a hexagonal configuration, when taking an orthogonal view thereof, and a longitudinal dimension that promotes the insertion of the first end portion 14 of the shank 12 into the rotary drive tool. This disposes the first end 20 of the hex holder member 18 a typical distance from rotary drive tool. As illustrated, the first end portion 14 of the shank 12 includes at least one recess 68 for receiving a detente securing means of the rotary drive tool, removably securing the shank 12 within the rotary drive tool.

The first end portion 20 of the hex holder member 18 is integrally joined to the second end 22 of the shank 12. In the illustrated embodiment, the hex holder member 18 includes a cylindrically configured outer wall, having longitudinal and radial dimensions that facilitate the inclusion of first and second inner recesses 26 and 44. In this embodiment, the first recess 26 is hexagonally configured and dimensioned to removably snugly receive corresponding portions of the first end portion 28 and first mid-portion 30 of the tool bit 16. The second recess 44 is hexagonally configured and dimensioned to removably snugly receive corresponding portions of the hexagonally configured periphery of the first end portion 34 of the adapter hex member 32.

In operation, the tool bit 16 is preselected from a myriad of tool bits having equal longitudinal and lateral dimensions including substantially similar first and second hexagonally configured mid-portions 30 and 40. It should be appreciated that the first and second end portions 28 and 38 of the tool bit 16 may vary in configuration and function. As illustrated, the first end portion 28 and first mid-portion 30 of the tool bit 16 are snugly insert into the first inner recess 26 of the hex holder member 18. The second end portion 38 and second mid-portion 40 of the tool bit 16 are snugly insert into the inner recess 36 in the hexagonally configured first end portion 34 of the adapter hex member 32. However, it should be appreciated that the reverse may occur, where the first end portion 28 and first mid-portion 30 are snugly insert into the first inner recess 36, while 26 the second end portion 38 and second mid-portion 40 of the tool bit 16 are snugly insert into the inner recess 26.

The adapter hex member 32 is dimensioned and configured such that when the first end portion 34 of the adapter hex member 32 engages the second end 24 of the hex holder member 18, the first end portion 28 of the inserted tool bit 16 is disposed adjacent to an end wall 70 of the first inner recess 26 in the hex holder member. The second end portion 38 of the tool bit 16 is disposed proximate to a second end 72 of the adapter hex member 32. The tool bit 16 is axially centered in the adapter hex member 32 via the hexagonally configured first inner recess 36 in the first end portion 34.

A second hexagonally configured inner recess 74 is defined in the second end portion 46 of the adapter hex member 32. The second inner recess 74 is, in at least one embodiment, axially aligned with and joined to the first inner recess 36, thereby providing an aperture in the adapter hex member 32 that allows the tool bit 16 to be inserted therethrough. The second inner recess 74 has a lateral dimension relatively larger than the lateral dimension of the first inner recess 36 thereby forming an inner "ledge" 76. Inner ledge 76 ultimately engages a first end 78 of the hexagonally configured first end portion 54 of the double collet member 52 as the first end 54 is snugly inserted into the second end portion 46 of the adapter hex member 32. The inner ledge 76 prevents continued insertion of the double collet member 52 into the adapter hex member 32.

As illustrated, the double collet member 52 includes a centrally disposed inner wall 80 that is substantially perpendicular to a longitudinal axis of the double collet member 52. The inner wall 80 ultimately engages the second end portion 38 of the tool bit 16. This engagement maintains the axial position of the tool bit 16 inside the hex holder member 18 after the tool bit 16 and adapter hex member 32 are inserted into the hex holder member 18, and the first end portion 54 of the double collet member 52 has been snugly inserted into the second end portion 46 of the adapter hex member 32.

In at least one embodiment, the second end portion 64 of the double collet member 52 includes a plurality of gripping arms 82 extending from a mid-portion 84 of the double collet member 52. The gripping arms 82 include outer arcuate walls 86 dimensioned to provide an outer cylindrical periphery that promotes insertion into the collet retention cap 56. The gripping arms 82 extend parallel to the longitudinal axis of the double collet member 52. The gripping arms 82 further include inner arcuate walls 88 that cooperate to grasp the securing end 62 of the drill bit 60 such that rotary motion is transferred from the first end portion 54 of the double collet member 52 to the drill bit 60. In at least one embodiment, the inner arcuate walls 88 have a radial dimension substantially equal to the radial dimension of the drill bit 60.

As illustrated, the inner arcuate walls 88 of the gripping arms 82 include an angled portion 90 that forms an acute angle with the outer arcuate walls 86 of the gripping arms 82. The inner arcuate walls 88 also include a straight portion 92 that extends substantially parallel to the outer arcuate walls 86 of the gripping arms 82. At least the angled portion 90 and straight portion 92 promote grasping of the securing end 62 of the drill bit 60 to transfer rotary motion from the double collet member 52 to the drill bit 60.

Figure 5:
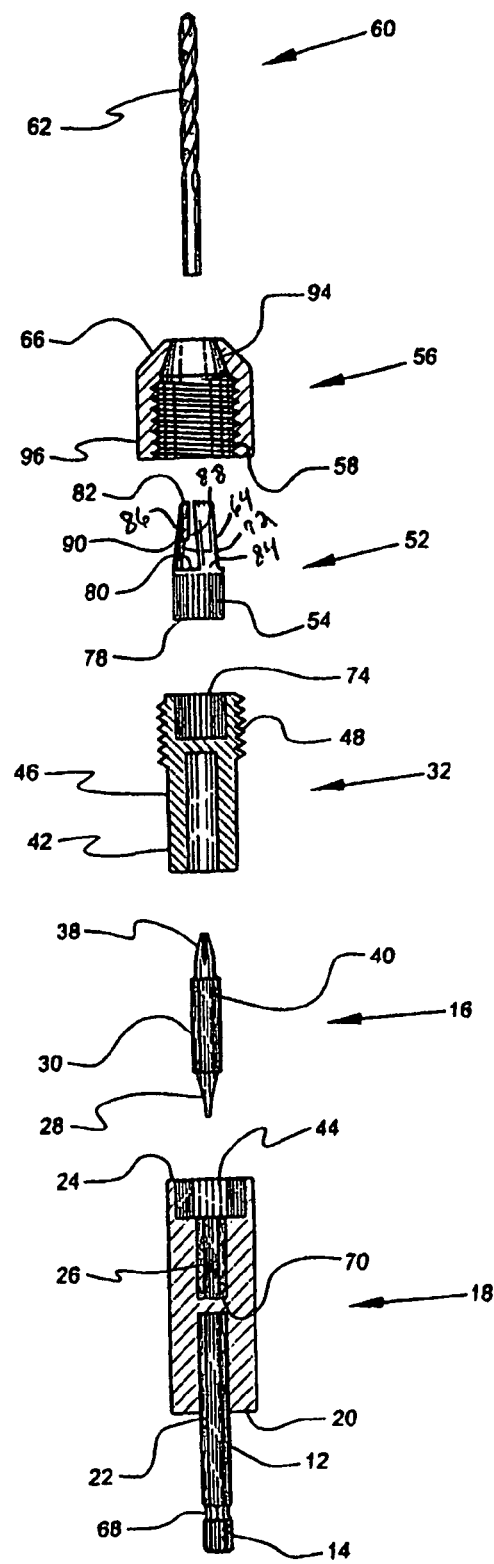
FIG. 5 depicts an exploded sectional elevational view of the fast change bit holder of FIG. 1 in accordance with one embodiment.

In at least one embodiment, the inner portion 66 of the collet retention cap 56 includes a frusto-conically configured inner recess 94 when taking a side sectional elevation view of the collet retention cap 56 (best viewed in FIG. 5). The collet retention cap 56 includes a cylindrically configured outer portion 96 having a threaded cylindrical inner wall that promotes the rotational joining of the collet retention cap 56 to the threaded outer wall 50 of the second end portion 46 of the adapter hex member 32. The rotational joining of the collet retention cap 56 to the adapter hex member 32 forcibly urges the inner arcuate walls 88 of the gripping arms 82 into congruent engagement with the securing end 62 of the drill bit 60, thereby promoting the transfer of rotary motion from the shank 12 to the drill bit 60. The forcible urging of the inner arcuate walls 88 of the gripping arms 82 against the securing end 62 of the drill bit 60 occurs after the second end portion 64 of the double collet member 52 is disposed inside the inner recess 94 of the collet retention cap 56, and after the securing end 62 of the drill bit 60 is disposed inside the second end portion 64 of the double collet member 32. The outer portion 96 of the collet retention cap 56 has a knurled outer surface to promote the grasping and rotation of the retention cap 56 upon the adapter hex member 32 by an individual operating the device 10.

In operation, an individual selects a drill bit 60 that is best suited and sized to drill recesses in or apertures through a workpiece. The selected drill bit 60 corresponds to the dimensions of a selected fastener that will be forcibly inserted in or through the workpiece. A tool bit 16 is then selected with a drive end capable of congruently engaging a head portion of the selected fastener such that rotary motion is transferred from the tool bit 16 to the fastener. The device 10 is then disassembled. The tool bit 16 is inserted into the first inner recess 26 in the hex holder member 18 such that the selected drive end of the tool bit 16 protrudes outward beyond the second end 24 of the hex holder member 18. The adapter hex member 32 is then inserted into the second inner recess portion 44 of the hex holder member 18 such that the end of the selected drill bit 16 is substantially flush with the second end 72 of the adapter hex member 32. The first end portion 54 of the double collet member 52 is then inserted into the second end portion 46 of the adapter hex member 32 until the end 78 of the first end portion 54 of the double collet member 52 engages the inner ledge 76 of the adapter hex member 32.

The selected drill bit 60 is then inserted into the second end portion 64 of the double collet member 52 until the securing end 62 of the drill bit 60 engages the inner wall 80 in the double collet member 52. The collet retention cap 56 is then rotationally secured to the treaded outer wall 50 of the second end portion 46 of the adapter hex member 32 until the gripping arms 82 of the double collet member 52 are forcibly urged into congruent engagement with the securing end 62 of the drill bit 60 via the walls of the frusto-conically configured inner recess 94 engaging the gripping arms 82 as the collet retention cap 56 is tightened, thereby re-assembling the fast change bit holder device 10. The first end portion 14 of the shank 12 is then inserted into a rotary drive tool until the recess 68 in the shank 12 is engaged by a detente mechanism in the rotary drive tool for example. The drill bit 60 is positioned to penetrate the workpiece a predetermined depth, whereupon, the adapter hex member 32 is quickly separated from the hex holder member 18, thereby exposing the tool bit 16 secured in the hex holder member 18 and allowing the tool bit 16 to engage and insert the selected fastener into the recess or through the aperture formed in the workpiece by the drill bit 60.

Figure 6:
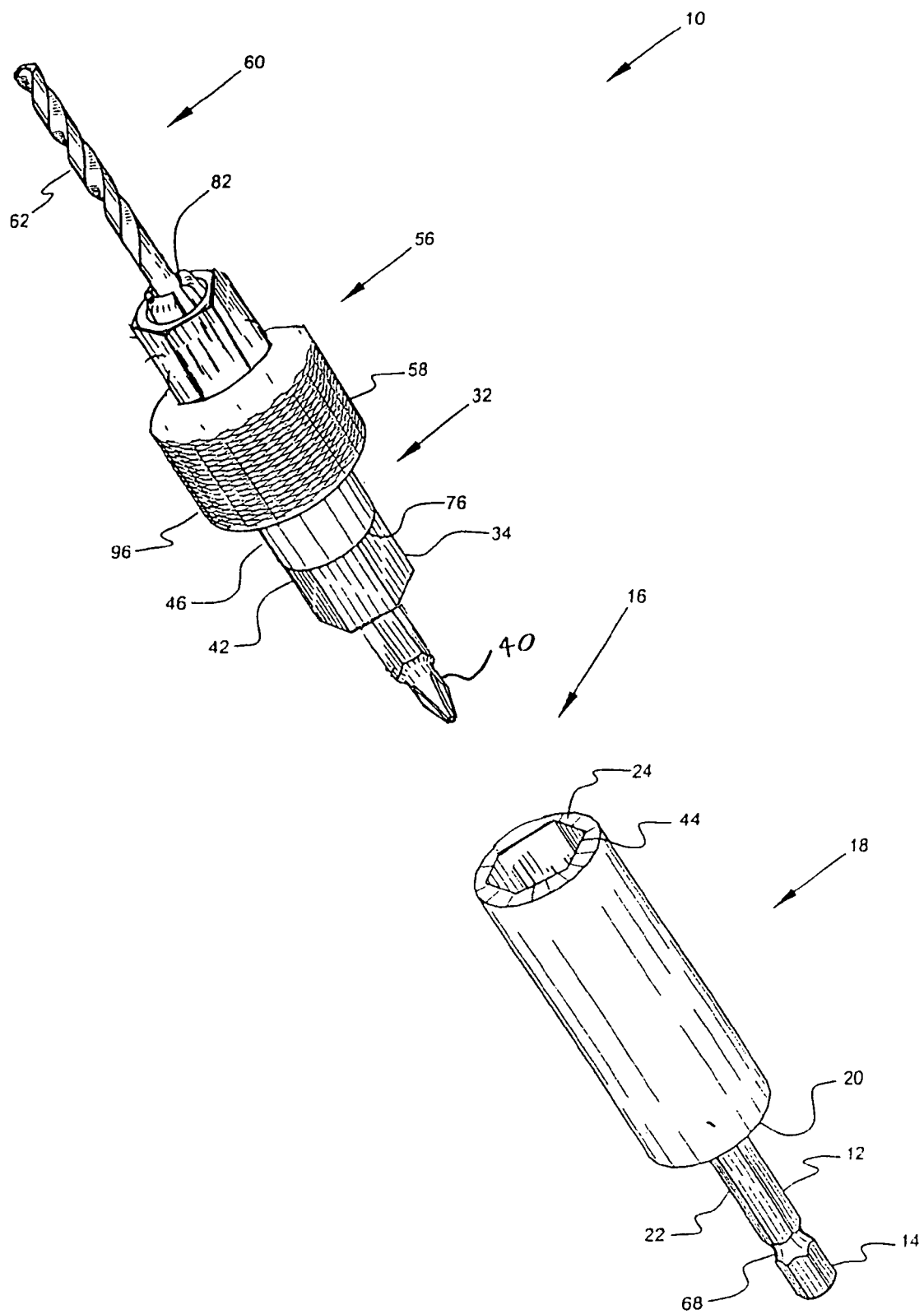
FIG. 6 depicts a partially exploded perspective view of a fast change bit holder device in accordance with another embodiment.
Figure 7:
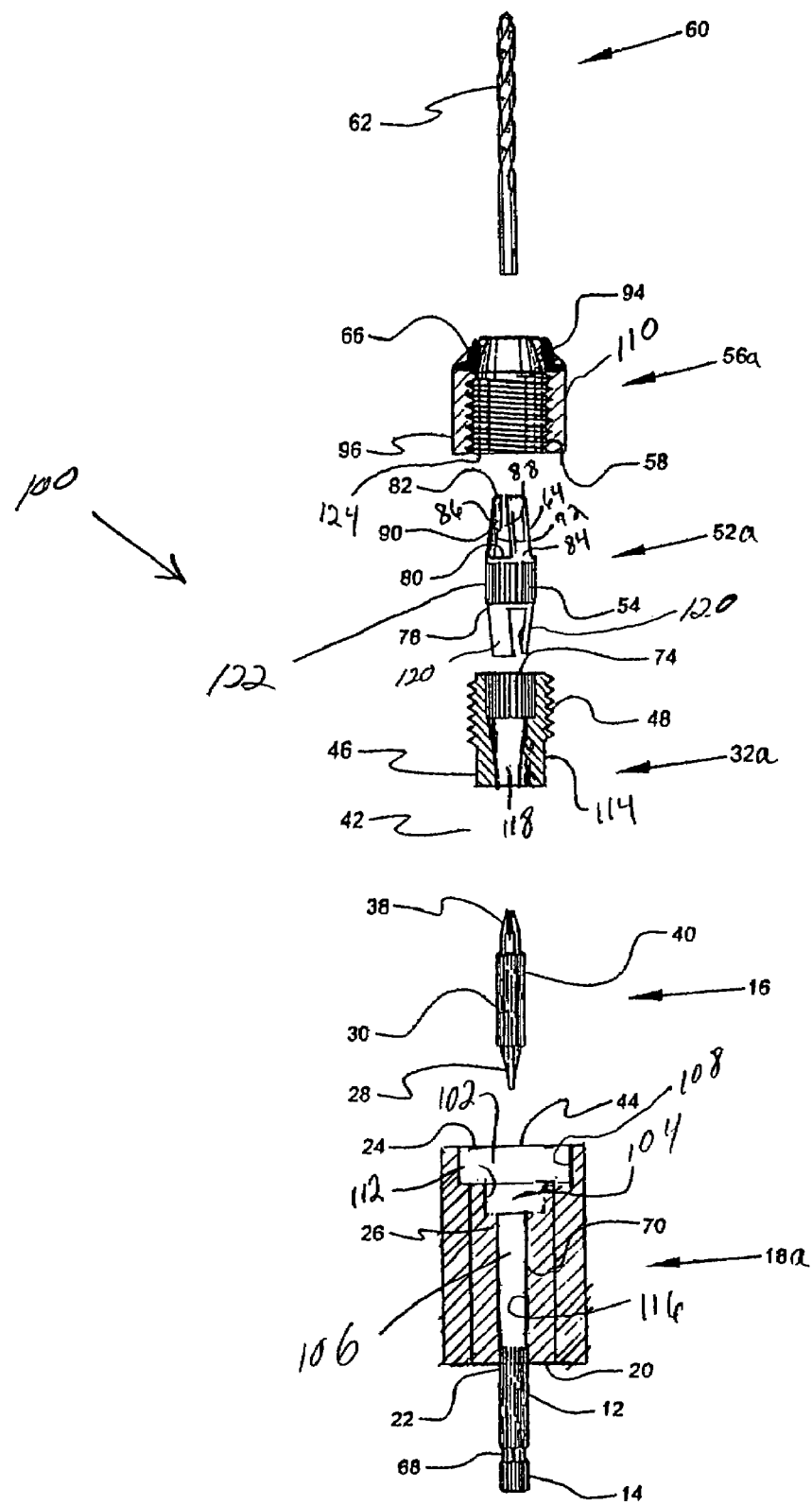
FIG. 7 depicts an exploded sectional elevational of the fast change bit holder of FIG. 6 in accordance with one embodiment.
Figure 8:
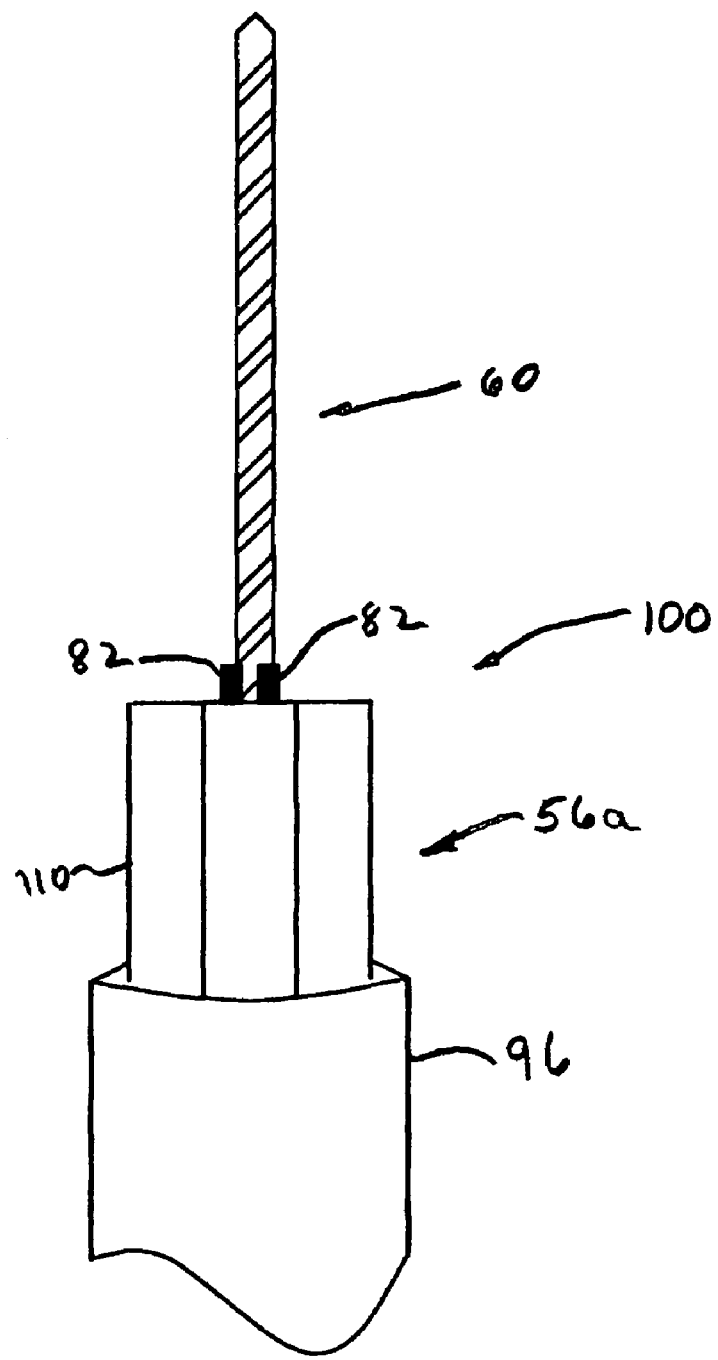
FIG. 8 depicts an enlarged view of the collet retention cap and drill bit of FIG. 7 in accordance with one embodiment.

Referring now to FIGS. 6, 7 and 8, an alternative embodiment of a fast change bit holder device is depicted and generally designated as numeral 100. FIGS. 6-8 depict another embodiment of the fast change bit holder of FIG. 5. More specifically, the tool bit 16 and drill bit 60 are the same components in both FIGS. 5, 6, 7 and 8. The hex holder member 18, adapter hex member 32, double collet member 52 and collet retention cap 56 of FIG. 5 have been modified in the embodiment illustrated in FIGS. 6-8 and designated numerals 18a, 32a, 52a and 56a respectively.

In this embodiment, hex holder member 18a includes an enlarged radial dimension that allows three axially aligned nested recesses 102, 104 and 106 to be centrally disposed in the hex holder member 18a. The first recess 102 has the largest radial dimension and includes a hexagonally configured inner wall 108 that is dimensioned to snugly engage a correspondingly configured hexagonal outer wall 110 of the collet retention cap 56a. The second recess 104 has a relatively smaller radial dimension than the first recess 102. The second recess 104 includes a hexagonally configured inner wall 112 that is dimensioned to snugly engage a correspondingly configured hexagonally outer wall 114 of the adapter hex member 32a. The third recess 106 includes a cylindrical inner wall 116 having a relatively smaller diameter than the radial dimension of the second recess 104. The diameter of the third recess 106 is dimensioned to promote the removable insertion of either the tool bit 16 or the drill bit 60 therein. In this embodiment, the integral joining of the shank 12 to the hex holder member 18a has been revised to allow the longitudinally longer third recess 106, which promotes the complete longitudinal insertion of the drill bit 60 into the hex holder member 18a when the tool bit 16 is required to insert or extract a fastener into or from a workpiece.

The adapter hex member 32a of this embodiment includes a "shortened" longitudinal dimension exhibited by character 42 on FIGS. 6 and 7 not engaging any portion of the modified adapter hex member 32a. The adapter hex member 32a further includes a frusto-conically configured recess 118 that "joins" or cooperates with the second inner recess 74, thereby providing an aperture through the modified adapter hex member 32a.

The double collet member 52a includes gripping arms 120. In at least one embodiment, gripping arms 120 have the same configuration and quantity as the arms 82 of the double collet member 52. The arms 120 are secured to a first end 78 of a hexagonally configured mid-portion 122 of the double collet member 52a.

The collet retention cap 56a is similar in many respects to the collet retention cap 56 depicted in FIGS. 1-5. However, in this embodiment, at least a portion of the knurled outer portion 96 of the original collet retention cap 56 comprises a hexagonally configured outer wall 110 of the collet retention cap 56a (best viewed in FIG. 6). However, at least one embodiment is contemplated in which the entire collet retention cap 56a includes a hexagonally configured outer wall 110.

In operation, the alternative fast change bit holder device 100 is assembled such that the drill bit 60 is exposed to penetrate a workpiece. Initially, the drill bit 60 is inserted between gripping arms 82 and the tool bit 16 is inserted between gripping arms 120. The drill bit 60 is inserted into the collet retention cap 56a via a first end 124 until the gripping arms 82 engage the walls forming the inner recess 94 of the collet retention cap 56a, and the tool bit 16 is inserted into the second inner recess 74 of the adapter hex member 32a until the gripping arms 120 engage the walls forming the recess 118 of the adapter hex member 32a. The adapter hex member 32a and the collet retention cap 56a are then threadedly secured together thereby forcing the gripping arms 82 into engagement with the drill bit 60. This forces the gripping arms 120 into engagement with the tool bit 16 until the drill bit 60, collet retention cap 56a, double collet member 52a, adapter hex member 32a and tool bit 16 are tightly joined together. After the respective members are assembled, the drill bit 60 and tool bit 16 protrude beyond respective end portions of the collet retention cap 56a and adapter hex member 32a, allowing the drill bit 60 to engage a workpiece and the tool bit 16 to engage a fastener.

To utilize the drill bit 60, the hex holder member 18a removably receives the assembled members detailed above by inserting the second end portion 46 of the adapter hex member 32a into the second recess 104 of the hex holder member 18a, thereby disposing the tool bit 16 into the third recess 106. Rotary motion is imparted upon the drill bit 60 via the shank 12 rotating the hex holder member 18a, which rotates the adapter hex member 32a, which rotates the double collet member 52a, which rotates the drill bit 60.

To utilize the tool bit 16, the hex holder member 18a is separated from the secured together members detailed above, thereby exposing the tool bit 16. The assembled members are then "flip-flopped" such that the drill bit 60 is inserted into the third recess 106 of the hex holder member 18a and the outer hex wall 110 of the collet retention cap 56a snugly and congruently engages the inner hex wall 108 of the first recess 102, thereby securing the exposed position of the tool bit 16 relative to a fastener. Rotary motion is imparted upon the tool bit 16 via the shank 12 rotating the hex holder member 18a, which rotates the collet retention cap 56a, which rotates the double collet member 52a, which rotates the adapter hex member 32a, which rotates the tool bit 16.

Figure 9:
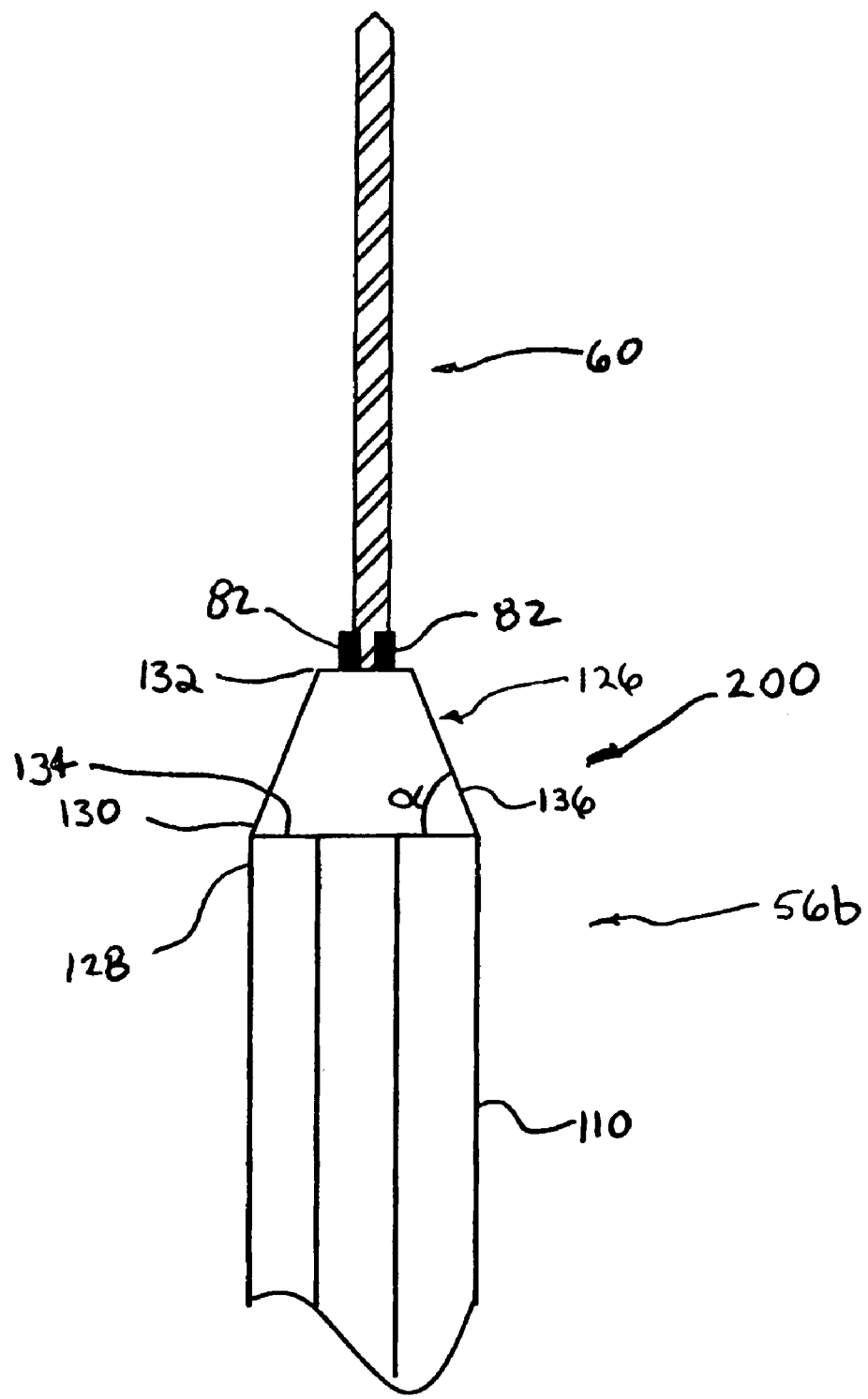
FIG. 9 depicts an enlarged view of a collet retention cap and drill bit of a fast change bit holder device in accordance with another embodiment.

FIG. 9 depicts another embodiment of the fast change bit holder device, generally designated as numeral 200. More specifically, the tool bit 16 and drill bit 60 illustrated here in FIG. 8 are the same as those depicted in FIGS. 5, 6, 7 and 8. The hex holder member 18a, adapter hex member 32a, and double collet member 52a are the same as those discussed above with respect to FIGS. 6-8. The collet retention cap 56 of FIG. 5 has been modified in this embodiment and designated as numeral 56b.

In this embodiment, hex holder member 18a includes the enlarged radial dimension and having the three axially aligned nested recesses 102, 104 and 106 centrally disposed in the hex holder member 18a. The collet retention cap 56b is similar in many respects to the collet retention cap 56a in FIGS. 6-8 including the hexagonally configured outer wall 110 configured to snugly and congruently engage the inner hex wall 108 as provided previously. This embodiment includes a countersink device configured to form a countersink function. In this embodiment, the countersink device comprises a frusto-conically configured portion or head 126 proximate second end 128 of collet retention cap 56b opposite first end 124. In at least one embodiment, at least the frusto-conically configured portion 126 is configured to perform the countersink function (i.e., the frusto-conically configured portion 126 is used to enlarge at least a portion of the aperture, forming a countersink, such that a head of an inserted fastener is substantially flush with the surface of the workpiece.

In at least one embodiment, the frusto-conically configured portion 126 has opposing first and second ends 130 and 132 with outer wall 136 defined therebetween. First end 130 is located proximate and connected to second end 128 of the collet retention cap 56b. In at least one embodiment, frusto-conically configured portion 126 is formed having a predetermined angle a, where angle a is defined with respect to a plane 134 proximate first end 130 and outer wall 136. In at least one embodiment, angle α is defined between 45 and 140 degrees (82 degrees for example).

In operation, the fast change bit holder device 200 is assembled such that the drill bit 60 is exposed to penetrate a workpiece similar to that provided previously. Initially, the drill bit 60 is inserted between gripping arms 82 and the tool bit 16 is inserted between gripping arms 120. The drill bit 60 is inserted into the collet retention cap 56b via first end 124, and the tool bit 16 is inserted into the second inner recess 74 of the adapter hex member 32a until the gripping arms 120 engage the walls forming the recess 118. The adapter hex member 32a and the collet retention cap 56b are then threadedly secured together, thereby forcing the gripping arms 82 into engagement with the drill bit 60, and forcing the gripping arms 120 into engagement with the tool bit 16 until the drill bit 60, collet retention cap 56b, double collet member 52a, adapter hex member 32a and tool bit 16 are tightly joined together.

To utilize the drill bit 60, the hex holder member 18a removably receives the assembled members detailed above by inserting the second end portion 46 of the adapter hex member 32a into the second recess 104 of the hex holder member 18a, thereby disposing the tool bit 16 into the third recess 106. Rotary motion is imparted upon the drill bit 60 via the shank 12 rotating the hex holder member 18a, which rotates the adapter hex member 32a, which rotates the double collet member 52a, which rotates the drill bit 60 and frusto-conically configured portion 126, simultaneously forming an aperture and countersink in the workpiece.

To utilize the tool bit 16, the hex holder member 18a is separated from the secured together members detailed above, thereby exposing the tool bit 16. The assembled members are then "flip-flopped" such that the drill bit 60 is inserted into the third recess 106 of the hex holder member 18a and the outer hex wall 110 of the collet retention cap 56b snugly and congruently engages the inner hex wall 108

Figure 10:
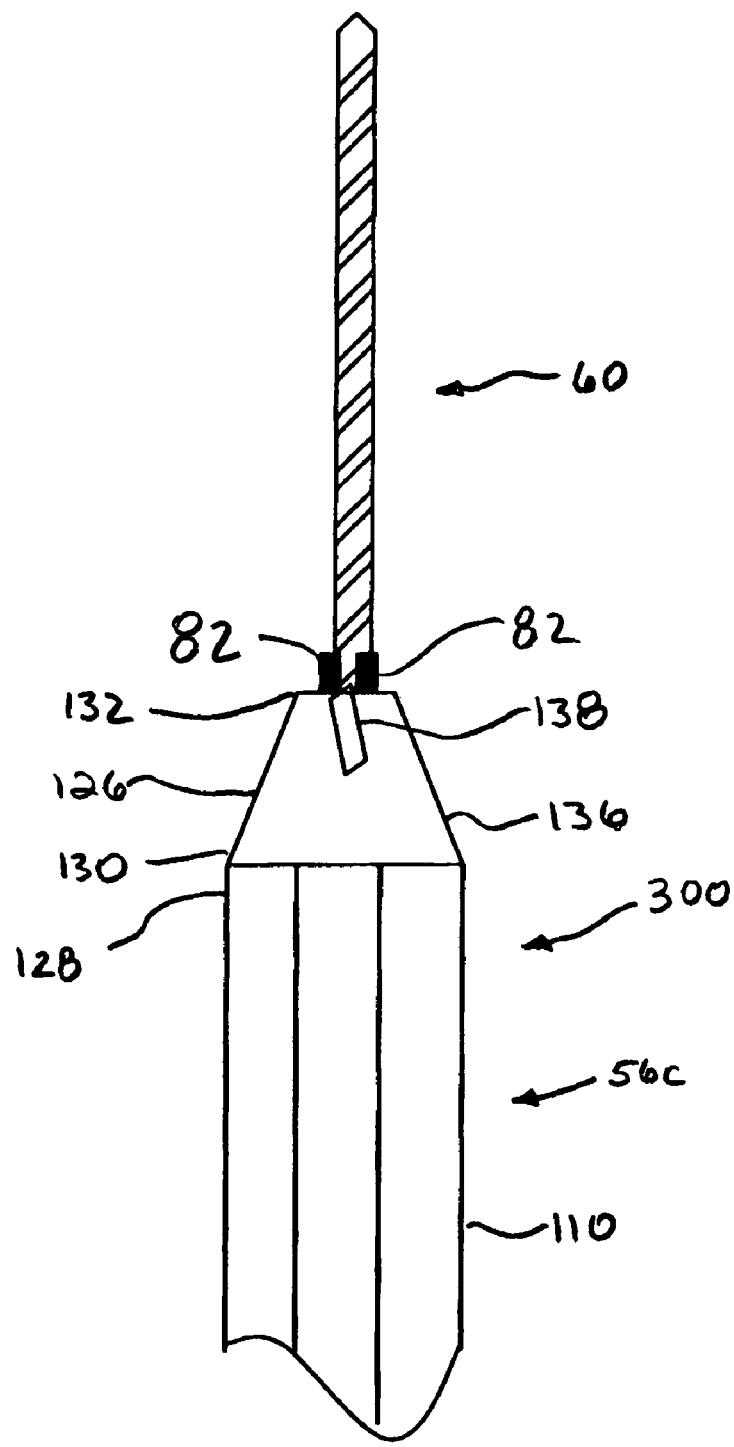
FIG. 10 depicts an enlarged view of a collet retention cap and drill bit of a fast change bit holder device in accordance with yet another embodiment.

FIG. 10 depicts yet another embodiment of the fast change bit holder device, generally designated as numeral 300. More specifically, the tool bit 16 and drill bit 60 illustrated here in FIG. 10 are the same as those depicted in FIGS. 1-9. The hex holder member 18a, adapter hex member 32a, and double collet member 52a are the same as those depicted in FIGS. 6-9. The collet retention cap 56 of FIGS. 1-5 has been modified in this embodiment and designated as numeral 56c.

The collet retention cap 56c is similar in many respects to the collet retention cap 56b in FIG. 9 including the hexagonally configured outer wall 110 configured to snugly and congruently engage the inner hex wall 108 and frusto-conically configured portion 126 as provided previously. In at least one embodiment, the frusto-conically configured portion 126 includes a flute 138 defined in outer wall 136, where the flute 138 is configured to form a countersink in the workpiece. It should be appreciated that, while only one flute 138 is illustrated, one or more flutes 138, spaced about frusto-conically configured portion 126 (equally or unequally spaced for example) are contemplated. Furthermore, while flute 138 is illustrated, other means for forming a countersink, including serrations formed in the outer wall 136, are contemplated.

In operation, the fast change bit holder device 300 is assembled such that the drill bit 60 is exposed to penetrate a workpiece similar to that provided previously with respect to embodiment 200. The drill bit 60 and tool bit 16 are utilized in a fashion similar to that described previously.

Figure 11:
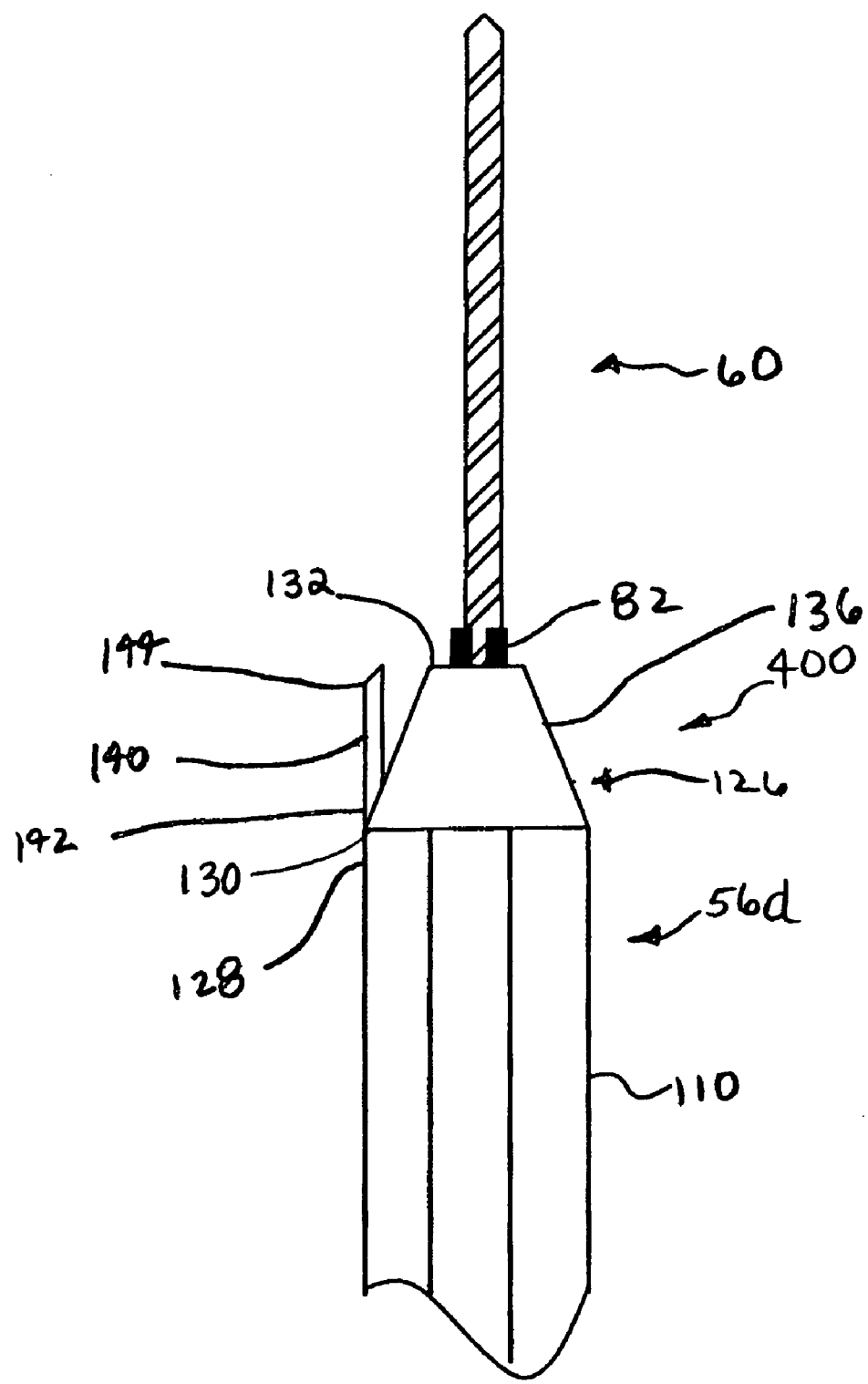
FIG. 11 depicts an enlarged view of a collet retention cap and drill bit of a fast change bit holder device in accordance with still another embodiment.

FIG. 11 depicts still another embodiment of the fast change bit holder device, generally designated as numeral 400. More specifically, the tool bit 16 and drill bit 60 illustrated here in FIG. 11 are the same as those depicted in FIGS. 1-10. The hex holder member 18a, adapter hex member 32a, and double collet member 52a are the same as those depicted in FIGS. 6-10. The collet retention cap 56 of FIGS. 1-5 has been modified in this embodiment and is designated numeral 56d.

The collet retention cap 56d is similar in many respects to the collet retention cap 56b in FIG. 9. In at least one embodiment, the frusto-conically configured portion 126 includes a protrusion 140 having opposing first and second ends 142 and 144. In the illustrated embodiment, first end 142 is located proximate and connected or joined to first end 130 of frusto-conically configured portion 126, while second end 144 extends outwardly away from first end 142 towards second end 132. In at least one embodiment, second end 144 is configured as an angled cutting surface, used to perform the countersink function. It should be appreciated that protrusion 140 extends straight out from the frusto-conically configured portion 126, it is contemplated that the protrusion may extend inwardly towards said frusto-conically configures portion 126. It should also be appreciated that, in at least this embodiment, at least the first recess 102 is dimensioned to accommodate protrusion 140 while snugly engaging collet retention cap 56d.

Figure 12:
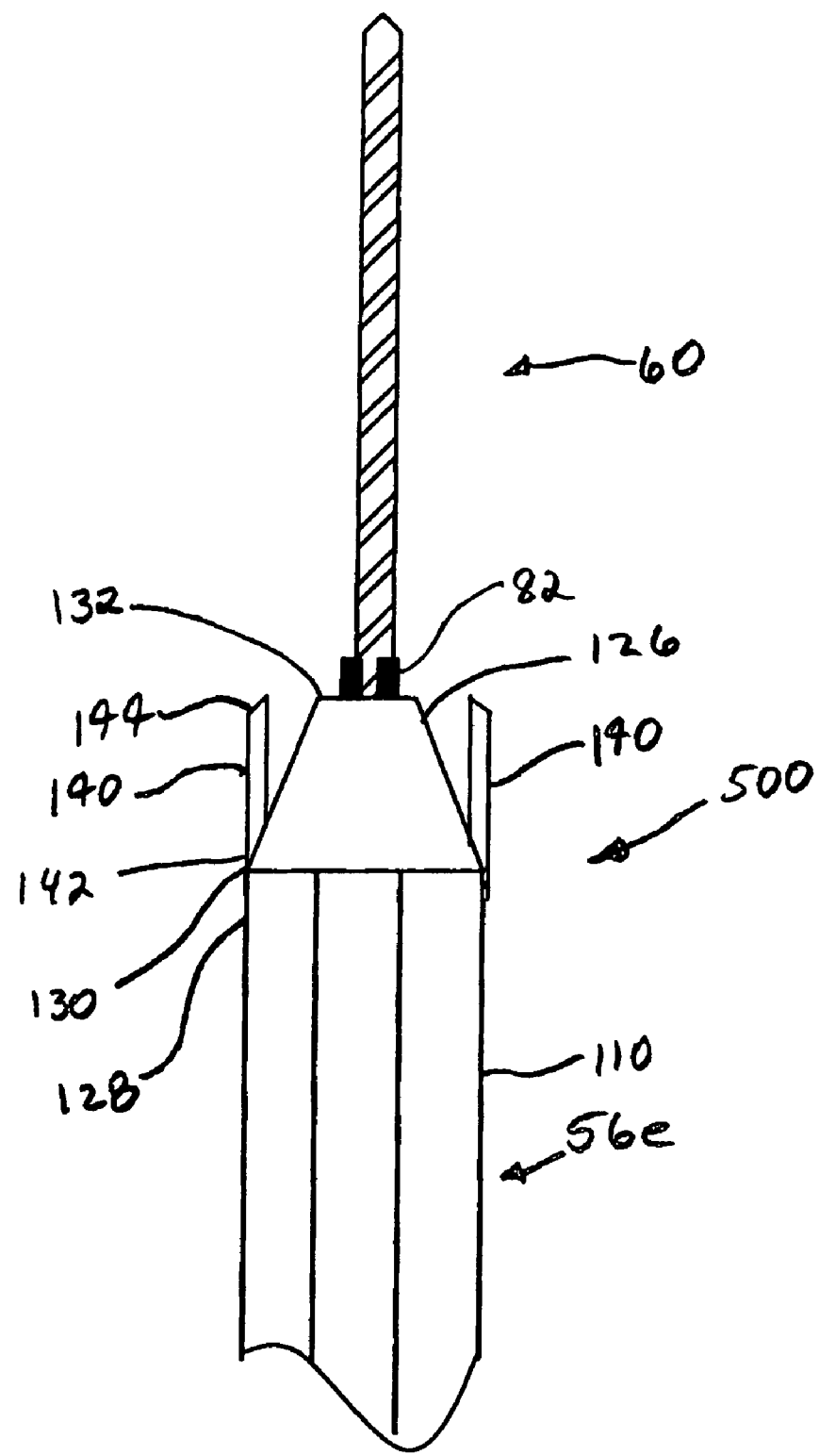
FIG. 12 depicts an enlarged view of a collet retention cap and drill bit of a fast change bit holder device in accordance with one other embodiment.

FIG. 12 depicts still another embodiment of the fast change bit holder device, generally designated as numeral 500. More specifically, the tool bit 16 and drill bit 60 illustrated here in FIG. 12 are the same as those depicted in FIGS. 1-11. The hex holder member 18a, adapter hex member 32a, and double collet member 52a are the same as those discussed with respect to FIGS. 6-11. Again, the collet retention cap 56 of FIGS. 1-5 has been modified in this embodiment and is designated 56e.

The collet retention cap 56e is similar in many respects to the collet retention cap 56d in FIG. 11. In at least one embodiment, the frusto-conically configured portion 126 includes a plurality of protrusions 140 spaced about frusto-conically configured portion 126 (equally or unequally spaced for example). As illustrated, each of the protrusions 140 (two are illustrated), have opposing first and second ends 142 and 144, where second end 144 may comprise an angled cutting edge for example. It should be appreciated that again the first recess 102 is dimensioned to accommodate the plurality of protrusions 140 while snugly engaging collet retention cap 56d.

Figure 13:
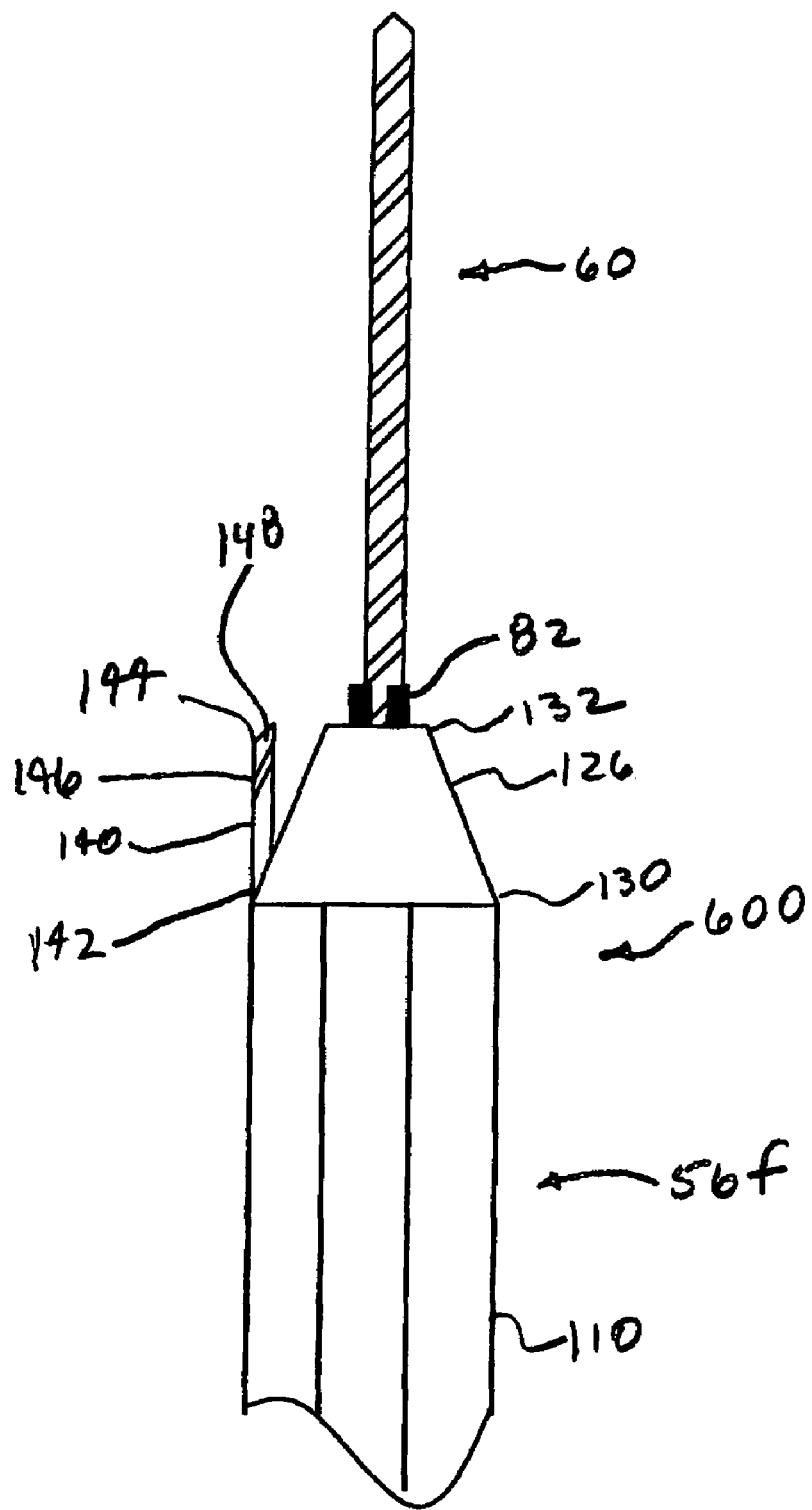
FIG. 13 depicts an enlarged view of a collet retention cap and drill bit of a fast change bit holder device in accordance with still one other embodiment.

FIG. 13 depicts still another embodiment of the fast change bit holder device, generally designated as numeral 600. More specifically, the tool bit 16 and drill bit 60 illustrated here in FIG. 13 are the same as discussed in the embodiment depicted in FIGS. 1-12. The hex holder member 18a, adapter hex member 32a, and double collet member 52a are the same as those depicted in FIGS. 6-12. The collet retention cap 56 of FIGS. 1-5 has been modified in this embodiment and is designated numeral 56f.

The collet retention cap 56f is similar in many respects to the collet retention cap 56d in FIG. 11. In this embodiment, the frusto-conically configured portion 126 includes a protrusion 140 having opposing first and second ends 142 and 144 similar to that discussed previously. However, in this embodiment protrusion 140 includes at least one flute 146 defined in surface 148. Protrusion 140 and flute 146 are configured to form a countersink as provided previously. It should be appreciated that, while flute 148 is illustrated proximate to second end 142, flute 148 may be formed anywhere on protrusion 140.

In operation, the fast change bit holder devices 300, 400 and 500 are assembled such that the drill bit 60 is exposed to penetrate a workpiece and form a countersink similar to that provided previously. Forming an aperture and securing the fastener utilizing the drill bit 60 and tool bit 16 of embodiments 300, 400 and 500 are similar to that described previously.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The embodiment of the invention in which an exclusive property or privilege is claimed is defined as follows:

1. A fast change bit holder device comprising:
    a tool bit;
    a hex holder member having first and second ends and configured to receive rotary force provided by a rotary drive tool, said hex holder member defining at least first and second inner recess portions for removably receiving first end and first mid-portions of said tool bit;
    an adapter hex member having first and second end portions, said adapter hex member defining an inner recess portion for removably receiving a second end portion and second mid-portions of said tool bit, said first end portion of said adapter hex member having an outer wall configured for removable insertion into said second inner recess portion of said hex holder member, said second end portion of said adapter hex member having threads disposed upon an outer wall thereof;
    a double collet member having first and second end portions, said first end portion configured to detachably receive said second end and second mid-portions of said tool bit, said double collet member, said second end and second mid-portions of said tool bit, and said first end portion of said adapter hex member being cooperatively configured to transfer rotary motion from said tool bit to said double collet member when said first end portion of said double collet member is forcibly inserted into said second end of said adapter hex member, and said second end portion and said second mid-portion of said tool bit are forcibly inserted into said first end of said adapter hex member;
    a collet retention cap having a threaded inner wall that corresponds to the threaded outer wall of said second end portion of said adapter hex member such that said collet retention cap is rotationally joined to said second end portion of said adapter hex member; and
    a drill bit having a securing end that removably inserts into said second end portion of said double collet member, said securing end of said drill bit, said second end portion of said double collet member and an inner portion of said collet retention cap being cooperatively configured to transfer rotary motion from said double collet member to said drill bit when said securing end of said drill bit and said second end portion of said double collet member are forcibly inserted into said inner portion of said collet retention cap, whereby said drill bit is capable of drilling an aperture into a workpiece whereupon said drill bit, said collet retention cap, said double collet member and said adapter hex member are removed from said hex holder member thereby, allowing said tool bit to forcibly insert a fastener into the workpiece via said aperture drilled into the workpiece by said drill bit.

2. The device of claim 1 wherein said first and second inner recesses of said hex holder member have a hexagonal configuration.

3. The device of claim 1 wherein said second inner recess of said hex holder member includes a configuration that cooperates with a first mid-portion of said tool bit such that rotary motion is transferred from said hex holder member to said tool bit.

4. The device of claim 1 wherein said inner recess portion of said adapter hex member is configured to cooperate with said second mid-portion of said tool bit such that rotary motion is transferred from said tool bit to said adapter hex member.

5. The device of claim 4 wherein said inner recess portion of said adapter hex member has a hexagonal configuration.

6. The device of claim 1 wherein said first end portion of said double collet member has an inner recess and an outer periphery having a hexagonal configuration, said inner recess and said outer periphery extending longitudinally to a mid-portion of said double collet member.

7. The device of claim 6 wherein said outer periphery of said first end portion of said double collet member is configured for snug insertion into said inner recess portion of said adapter hex member such that said inner recess of said double collet member is configured to snugly receive said second end and said second mid-portions of said tool bit such that rotary motion is transferred from said tool bit to said first end portion of said double collet member.

8. The device of claim 7 wherein an inner wall of said double collet member engages a tip portion of said tool bit, maintaining a position of said tool bit when said tool bit is forcibly disposed inside said inner recess of said double collet member, said inner wall being perpendicular to a longitudinal axis of said double collet member.

9. The device of claim 1 wherein said second end portion of said double collet member includes a plurality of gripping arms extending from a mid-portion of said double collet member.

10. The device of claim 9 wherein said gripping arms include:
a) outer arcuate walls dimensioned to provide an outer cylindrical periphery configured to promote insertion into said collet retention cap; and
b) inner arcuate walls that cooperate to grasp said drill bit such that rotary motion is transferred from said first end portion of said double collet member to said drill bit, said inner arcuate walls having a radial dimension substantially equal to the radial dimension of said drill bit.

11. The device of claim 10 wherein said gripping arms extend parallel to a longitudinal axis of said double collet member.

12. The device of claim 10 wherein said inner arcuate walls of said gripping arms include:
a) an angled portion that forms an acute angle with said outer arcuate walls of said gripping arms thereby promoting the insertion of said securing end of said drill bit into said second end portion of said double collet member; and
b) a straight portion that extends parallel to said outer arcuate walls of said gripping arms thereby promoting grasping of said securing end of said drill bit to transfer rotary motion from said double collet member to said drill bit.

13. The device of claim 12 wherein said inner portion of said collet retention cap defines a frusto-conically configured inner recess when taking a side sectional elevation view of said collet retention cap.

14. The device of claim 13 wherein said collet retention cap includes a cylindrically configured outer portion having a threaded cylindrical inner wall that promotes the rotational joining of said collet retention cap to said threaded outer wall of said second end of said adapter hex member.

15. The device of claim 14 wherein said rotational joining of said collet retention cap to said adapter hex member forcibly urges said inner arcuate walls of said gripping arms into congruent engagement with said securing end of said drill bit thereby promoting the transfer of rotary motion to said securing end of said drill bit, said forcible urging of said inner arcuate walls of said gripping arms against said securing end of said drill bit occurring after said second end portion of said double collet member is disposed inside said inner recess of said collet retention cap, and after said securing end of said drill bit is disposed inside said second end portion of said double collet member.

16. The device of claim 15 wherein said adapter hex member, double collet member, collet retention cap and drill bit are separable from said hex holder member and tool bit after drilling an aperture through a workpiece, thereby allowing said tool bit to forcibly insert a fastener through said aperture and into a structure supporting said workpiece.

17. The device of claim 2 wherein at least a portion of said collet retention cap has a hexagonally configured outer wall configured to be removably snugly received in said first inner recess in said hex holder member.

18. The device of claim 17 wherein at least a portion of said collet retention cap comprises a countersink device.

19. The device of claim 18 wherein said countersink comprises a frusto-conically configured portion.

20. The device of claim 18 wherein said countersink device comprises at least one protrusion having opposing first and second ends, said first end coupled to said collet retention cap and said second end extending outwardly therefrom.

21. The device of claim 18 wherein said countersink device comprises at least one flute formed in an outer wall of said countersink device.

22. A fast change bit holder device comprising:
a shank having first and second end portions, said first end portion configured for rotary insertion into a rotary drive tool;
a tool bit;
a hex holder member having first and second ends, said first end joined to said second end of said shank, said hex holder member defining nested first, second and third inner recess portions;
an adapter hex member having first and second end portions, said first end portion defining an inner frusto-conically configured recess, said second end portion including a hexagonally configured inner wall and a threaded outer wall;
a double collet member having opposing first and second end portions with a plurality of gripping arms integrally joined to each of said end portions, said double collet member defining a hexagonally configured mid-portion disposed between said opposing end portions;
a collet retention cap having a cylindrically configured first inner recess with a threaded inner wall that corresponds to said threaded outer wall of said second end portion of said adapter hex member such that said collet retention cap is rotationally joined to said second end portion of said adapter hex member, said collet retention cap defining a frusto-conically configured second inner recess disposed adjacent to said first inner recess thereby providing an aperture through said collet retention cap;
a drill bit having a securing end that removably inserts into a second end portion of said double collet member, said securing end of said drill bit and said second end portion of said double collet member and an inner portion of said collet retention cap being cooperatively configured to transfer rotary motion from said double collet member to said drill bit when said securing end of said drill bit and said second end portion of said double collet member are forcibly inserted into said inner portion of said collet retention cap whereby said drill bit is capable of drilling an aperture into a work piece, said first end portion of said double collet member forcibly grasping said tool bit upon said double collet member being forced into said adapter hex member thereby disposing said tool bit inside said third recess of said hex holder member whereupon said tool bit and said drill bit are switchable, thereby allowing said tool bit to forcibly insert a fastener into the workpiece via the aperture drilled into the workpiece by said drill bit.

23. The device of claim 22 wherein at least a portion of said collet retention cap has a hexagonally configured outer wall configured to be removably snugly received in said first inner recess in sad hex holder member.

24. The device of claim 23 wherein at least a portion of said collet retention cap comprises a countersink device.

25. The device of claim 24 wherein said countersink comprises a frusto-conically configured portion proximate said securing end of said drill bit.

26. The device of claim 25 wherein said countersink device comprises at least one protrusion extending outwardly from said collet retention cap.

27. The device of claim 26 wherein said countersink device comprises at least one flute formed in an outer wall of said countersink device.

* * * * *